(12) United States Patent
Motono et al.

(10) Patent No.: US 6,603,866 B1
(45) Date of Patent: Aug. 5, 2003

(54) IMAGE RECORDING/REPRODUCING APPARATUS AND ITS METHOD

(75) Inventors: Chihiro Motono, Saitama (JP); Masahiro Matsushita, Kanagawa (JP); Yasuyuki Nagata, Kanagawa (JP); Shiro Miyagi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/345,981

(22) Filed: Jul. 1, 1999

(30) Foreign Application Priority Data

Jul. 3, 1998 (JP) ............................................ 10-189293

(51) Int. Cl.[7] ................................................ G06K 9/00
(52) U.S. Cl. .................... 382/107; 348/208.1; 382/236; 386/120
(58) Field of Search ................................ 382/100, 232, 382/233, 235, 305, 236; 358/448, 444, 456, 296; 345/582, 723; 348/207, 211, 219, 231, 575, 208.1; 375/240.12, 240.16; 386/112, 121, 120; 725/115

(56) References Cited

U.S. PATENT DOCUMENTS

| | | | | |
|---|---|---|---|---|
| 4,675,750 A | * | 6/1987 | Collins et al. ................ 360/9.1 |
| 4,729,035 A | * | 3/1988 | Tanioka ....................... 358/426 |
| 4,858,032 A | * | 8/1989 | Okada et al. .................. 360/91 |
| 4,912,570 A | * | 3/1990 | Kinoshita et al. .............. 360/8 |
| 4,947,265 A | * | 8/1990 | Hayashi et al. .............. 358/341 |
| 5,164,831 A | * | 11/1992 | Kuchta et al. ............. 348/233 |
| 5,283,638 A | * | 2/1994 | Engberg et al. ................ 348/14 |
| 5,283,659 A | * | 2/1994 | Akiyama et al. ........... 358/310 |
| 5,307,160 A | * | 4/1994 | Enari .......................... 358/500 |
| 5,497,238 A | * | 3/1996 | Sato et al. ................... 358/310 |
| 5,517,652 A | * | 5/1996 | Miyamoto .................. 395/800 |

* cited by examiner

Primary Examiner—Jayanti K. Patel
(74) Attorney, Agent, or Firm—Frommer Lawrence & Haug LLP; William S. Frommer; Glenn F. Savit

(57) ABSTRACT

In an image recording/reproducing apparatus and its method which is capable of readily extracting a still image from a moving image for recording, a still image designated by the user is extracted from a moving image inputted from image input/output means (C1–C5) or from a moving image reproduced by moving image recording means (11, 12), and the extracted still image is recorded in still image recording means (22); thereby making it possible to readily extract a still image from a moving image and record the extracted still image, without interconnecting a plurality of devices as required before, and highly improving the usability in consequence.

8 Claims, 1 Drawing Sheet

IMAGE RECORDING/REPRODUCING APPARATUS AND ITS METHOD

BACKGROUND OF THE INVENTION

1. Field of the Invention

The present invention relates to an image recording/reproducing apparatus and its method, and more particularly, is suitably applied, for example, to a recording/reproducing system for recording and reproducing a desired still image within a moving image.

2. Description of the Related Art

As a recording/reproducing system of the type mentioned above, a camera built-in type video tape recorder (hereinafter referred to as the "camcorder") is connected to a personal computer by a predetermined cable. In such a recording/reproducing system, to record one desired frame which is in moving image data recorded, for example, on a magnetic tape, first the camcorder reproduces the moving image data from the magnetic tape, and then sends the moving image data to the personal computer. The personal computer extracts the desired frame from the moving image data sent thereto from the camcorder, and stores this in an internal memory as still image data.

For the recording/reproducing system configured as above, since the user must previously connect the camcorder with the personal computer by the predetermined cable, a complicated connecting operation is required. Also, this type of recording/reproducing system forces the user to separately manipulate the camcorder and the personal computer even after these two components have been connected. This gives difficulties in improving the operability.

SUMMARY OF THE INVENTION

In view of the foregoing, an object of this invention is to provide an image recording/reproducing apparatus and its method which is capable of highly improving the operability as compared with the prior art.

The foregoing object and other objects of the invention have been achieved by the provision of an image recording/reproducing apparatus and its method in which, a moving image inputted through image input/output means is recorded in moving image recording means in order to reproduce a moving image from the moving image recording means in response to a request from the user. This is comprised of still image extracting means for extracting a still image designated by the user from a moving image inputted through the image input/output means or from a moving image reproduced from the moving image recording means, and still image recording means for recording said still image extracted from the still image extracting means.

A still image designated by the user is extracted from a moving image inputted through the image input/output means or from a moving image reproduced by the moving image recording means, and the extracted still image is recorded on the still image recording means; thereby making it possible to readily extract and record a still image from a moving image without interconnecting a plurality of devices as required in the prior art.

The nature, principle and utility of the invention will become more apparent from the following detailed description when read in conjunction with the accompanying drawing in which like parts are designated by like reference numerals or characters.

DETAILED DESCRIPTION OF THE EMBODIMENT

Figure 1:
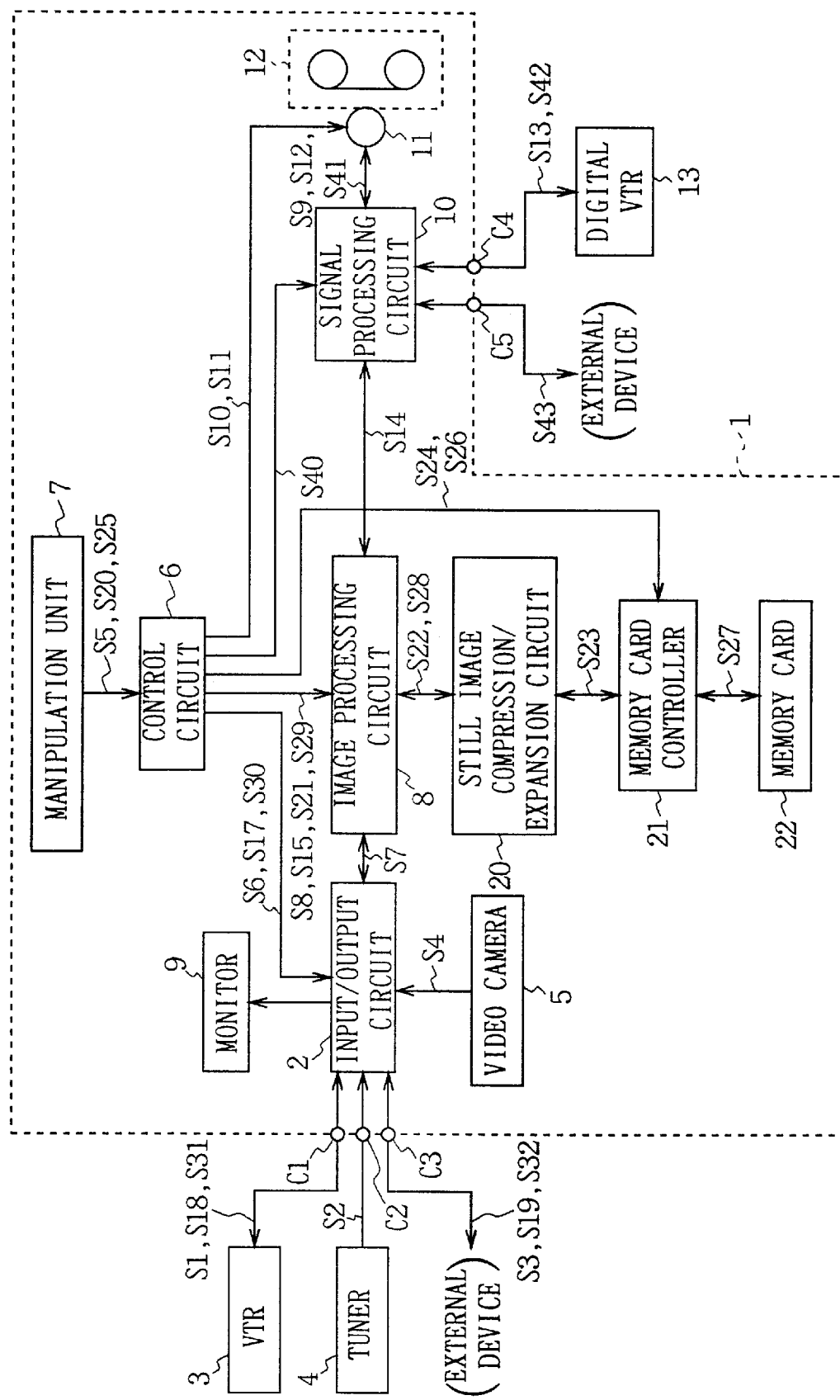
FIG. 1 is a block diagram illustrating an embodiment of a recording/reproducing apparatus according to the present invention.

Preferred embodiment of this present invention will be described with reference to the accompanying drawing:

In FIG. 1, a recording/reproducing apparatus, shown as a whole by reference numeral 1, is capable of recording and reproducing one desired frame out of moving image data as still image data. An input/output circuit 2 is connected through a line input terminal C1 to an external video tape recorder (VTR: Video Tape Recorder) 3, through a line input terminal C2 connected to an external tuner 4, through a line input terminal C3 connected to another external device, and further connected to a video camera 5 which is built in the recording/reproducing apparatus 1.

Among the foregoing components, the VTR 3 reproduces a moving image signal S1 in the form of an analog signal, for example, from a magnetic tape loaded therein, and outputs this reproduced moving image signal S1 to the input/output circuit 2 through the line input terminal C1. The tuner 4 receives a television signal from a broadcasting station, decodes the television signal by a built-in decoder to generate a moving image signal S2 in the form of an analog signal, and then outputs the moving image signal S2 through the line input terminal C2 to the input/output circuit 2 in the recording/reproducing apparatus 1. The other external device outputs a desired moving image signal S3 through the line input terminal 3 to the input/output circuit 2 in the recording/reproducing apparatus 1. Furthermore, the video camera 5 shoots a target object to generate a moving image signal S4 in the form of an analog signal which is outputted to the input/output circuit 2.

A control circuit 6, which is responsible for controlling the entire recording/reproducing apparatus 1, controls each block based on manipulation information S5 supplied thereto from a manipulation unit 7. In this case, the input/output circuit 2 selects the one designated by the user among: the moving image signal S1 supplied from the VTR 3; the moving image signal S2 supplied from the tuner 4; the moving image signal S3 supplied from the other external device; and the moving image signal S4 supplied from the video camera 5; based on an input selection signal S6 supplied thereto from the manipulation unit 7 through the control circuit 6. Then, the input/output circuit 2 analog-to-digital (A/D) converts the selected moving image signal to generate moving image data S7, which is outputted to an image processing circuit 8 as well as to a monitor 9 for display.

The image processing circuit 8, when supplied with a recording control signal S8 for instructing to record a moving image from the manipulation unit 7 through the control circuit 6, outputs the moving image data S7 to the signal processing circuit 10. The signal processing circuit 10 compresses and encodes the moving image data S7, based on an encoding scheme in accordance with, for example, the Digital Video (DV) standard which was established by the HD digital VCR conference, and then applies a magnetic head 11 with encoded moving image data S9 obtained by compressing and encoding. The magnetic head 11 records the encoded moving image data S9 on a magnetic tape 12 based on a write command signal S10 supplied thereto from the control circuit 6.

On the other hand, the magnetic head 11, when supplied with a read command signal S11 from the manipulation unit 7 through the control circuit 6, reproduces encoded moving image data S12 from the magnetic tape 12, and applies the encoded moving image data S12 to the signal processing circuit 10. The signal processing circuit 10 is also connected to an external digital VTR 13 through a DV input terminal C4, and also connected to an external device through a DV input terminal C5. The digital VTR 13 reproduces desired encoded moving image data S13 when required, and outputs the reproduced encoded moving image data S13 through the DV input terminal C4 to the signal processing circuit 10 in the recording/reproducing apparatus 1.

The signal processing circuit 10 expands and decodes the encoded moving image data S12 or S13 supplied thereto, and outputs obtained moving image data S14 to the image processing circuit 8. The image processing circuit 8, when supplied with a reproduction control signal S15 which indicates an instruction for reproducing a moving image, from the manipulation unit 7 through the control circuit 6, outputs the moving image data S14 to the input/output circuit 2. The input/output circuit 2 displays the moving image data S14 on the monitor 9, and digital-to-analog (D/A) converts the moving image data A14 to generate a moving image signal. Then, the input/output circuit 2 outputs the moving image signal to the external VTR 3 through the line input terminal C1 as a moving image signal S18, or outputs the moving image signal to the other external device through the line input terminal C3 as a moving image signal S19, based on an output selection signal S17 supplied thereto from the manipulation unit 7 through the control circuit 6.

The control circuit 6, when supplied with manipulation information S20 for instructing to record a still image based on the request of the user through the manipulation unit 7, generates a still image recording command signal S21 based on the manipulation information S20, and supplies the still image recording signal S21 to the image processing circuit 8. The image processing circuit 8 detects a vertical synchronization signal in the moving image data S7 supplied from the input/output circuit 2 or in the moving image data S14 supplied from the signal processing circuit 10, with the still image recording command signal S21 used as a trigger, to extract one desired frame designated by the user from the moving image data S7 or S14, and outputs the extracted frame as still image data S22 to a still image compression/expansion circuit 20.

The still image compression/expansion circuit 20 compresses and encodes the still image data S22 based on an encoding scheme, for example, in accordance with the Joint Photographic Experts Group (JPEG) standard, and outputs that obtained encoded still image data S23 to a memory card controller 21. The memory card controller 21 writes the encoded still image data S23 into a memory card 22 based on a still image recording command signal S24 supplied thereto from the control circuit 6.

The control circuit 6, when supplied with manipulation information S25 for instructing to reproduce a still image from the manipulation unit 7, generates a still image reproducing command signal S26 based on the manipulation information S25, and supplies the still image reproducing command signal S26 to a memory card controller 21. The memory card controller 21, when supplied with the still image reproducing command signal S26, reads out encoded still image data S27 from the memory card 22, and outputs the read-out encoded still image data S27 to the still image compression/expansion circuit 20.

The still image compression/expansion circuit 20 expands and decodes the encoded still image data S27, and outputs still image data S28 obtained by decoding to the image processing circuit 8. The image processing circuit 8 outputs the still image data S28 to the input/output circuit 2 or to the signal processing circuit 10, based on a still image output control signal S29 supplied thereto from the manipulation unit 7 through the control circuit 6.

The input/output circuit 2 displays the still image data S28 on the monitor 9 as well as D/A converts the still image data S28 to generate a still image signal; which is outputted as a still image signal S31 to the VTR 3 through the line input terminal C1, or as a still image signal S32 to the other external device through the line input terminal C3, based on a still image output selection signal S30 supplied thereto from the control circuit 6.

The signal processing circuit 10 compresses and encodes the still image data S28 to generate encoded still image data; which is written in as encoded still image data S41 on the magnetic tape 12 by the magnetic head 11, or outputted as encoded still image data S42 to the digital VTR 13 through the DV input terminal C4, or outputted to the other external device through the DV input terminal C5, based on a still image output selection signal S40 supplied thereto from the control circuit 6.

In the configuration described above, the recording/reproducing apparatus 1 extracts one desired frame from the moving image data S7 supplied thereto from the external device or from the moving image data S14 reproduced from the magnetic tape 12 loaded therein, and writes the desired frame as the still image data S22 into the memory card 22; thereby, not as in the prior art, avoiding troubles of connecting a camcoder having a function of recording and reproducing a moving image with a personal computer having a function of extracting and recording a desired still image from the moving image. Therefore no need for separately manipulating these two devices.

According to the configuration described above, one desired frame is extracted from the moving image data S7 supplied from the external device or from the moving image data S14 reproduced from the loaded magnetic tape 12, and is written as the still image data S22 into the memory card 22; thereby making it possible to readily extract a still image from a moving image to be recorded without connecting a plurality of devices and highly improving the usability in comparison with the prior art.

While the foregoing embodiment has been described for the recording/reproducing apparatus 1 when connected with the VTR 3 and the tuner 4, the present invention is not limited thereto. Alternatively, by having the functions of a VTR and a tuner built in a recording/reproducing apparatus, similar effects to the above can be produced.

Also, while the foregoing embodiment has been described for the recording/reproducing apparatus 1 having the built-in video camera 5, the present invention is not limited thereto. Alternatively, it is possible to have a video camera provided externally to a recording/reproducing apparatus and connected to the recording/reproducing apparatus through a line input terminal.

Further, while the foregoing embodiment has been described for the moving image data S7 when compressed and encoded in accordance with the encoding scheme defined by the DV standard, the present invention is not limited thereto. Alternatively, by having the moving image data S7 compressed and encoded in accordance with any of other encoding schemes such as, for example, the encoding scheme defined by the D-1 standard which was established by Society of Motion Picture and Television Engineers (SMPTE), similar effects to the above can be produced.

Further, while the foregoing embodiment has been described for the still image data S22 when compressed and encoded in accordance with the encoding scheme defined by the JPEG standard, the present invention is not limited thereto. Alternatively, by having the still image data S22 compressed and encoded in accordance with any of other encoding schemes such as, for example, the encoding scheme defined by the Moving Picture Experts Group (MPEG) standard, similar effects to the above can be produced.

Further, while the foregoing embodiment has been described for the encoded moving image data S9 when recorded on the magnetic tape 12, the present invention is not limited thereto. Alternatively, by having the encoded moving image data S9 recorded on any of other recording media, such as, for example, a hard disk, similar effects to the above can be produced.

Further, while the foregoing embodiment has been described for the encoded still image data S23 when written into the memory card 22, the present invention is not limited thereto. Alternatively, by having the encoded still image data S23 recorded on any of other recording media, such as Random Access Memory (RAM), similar effects to the above can be produced.

According to the present invention as described above, a still image designated by the user is extracted from a moving image inputted through image input/output means or a moving image reproduced by moving image recording means, and the extracted still image is recorded on still image recording means, thereby making it possible to readily extract and record a still image from a moving image without interconnecting a plurality of devices, as has been required before, and highly improving the usability in consequence.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image recording/reproducing apparatus comprising:

image recording/reproducing means for recording an inputted moving image signal in a first recording medium and reproducing said inputted image signal;

input selecting means for selecting one input signal from a plurality of moving image input signals including a television signal, a camera signal and a reproduction signal from said image recording/reproducing means;

still image extracting means for extracting a still image from an input moving image signal selected by said input selecting means; and still image recording means for recording said still image extracted by said still image extracting means in a memory card.

2. The image recording/reproducing apparatus according to claim 1, wherein said still image recording means comprises a compression/expansion circuit.

3. The image recording/reproducing apparatus according to claim 1, further comprising a built-in camera, wherein said camera signal is supplied from said built-in camera.

4. The image recording/reproducing apparatus according to claim 1, wherein one of the inputted signals selected by said input selecting means is a moving image supplied from an external image recording/reproducing apparatus.

5. The image recording/reproducing apparatus according to claim 1, wherein said still image is reproduced from said second recording medium, and said still image is outputted to an external device or recorded in said first recording medium through said input selecting means.

6. The image recording/reproducing apparatus according to claim 1, wherein said image recording/reproducing means records and reproduces a digitized image.

7. An image recording/reproducing method for use in a video camera apparatus, comprising the steps of:

recording an input moving image signal on a first recording medium within said video camera apparatus;

selectively reproducing the moving image signal from said first recording medium;

selecting a moving image input signal from a plurality of moving image input signals including a television signal, a camera signal and the reproduced moving image signal;

extracting a still image from the selected input signal; and recording said extracted still image on a memory card used in said video camera apparatus.

8. The image recording/reproducing method of claim 7, further comprising the step of outputting said reproduced still image to an external device.

* * * * *